INVENTOR.
JOHN W. BROOKS
ATTORNEYS

Jan. 30, 1962  J. W. BROOKS  3,018,481
SAFETY SHIELD FOR EXPLOSIVELY DRIVEN TOOLS
Filed March 2, 1955  3 Sheets-Sheet 2

INVENTOR.
JOHN W. BROOKS
BY
ATTORNEYS

INVENTOR.
JOHN W. BROOKS

United States Patent Office 3,018,481
Patented Jan. 30, 1962

3,018,481
SAFETY SHIELD FOR EXPLOSIVELY DRIVEN TOOLS
John W. Brooks, Bridgeport, Conn., assignor to Remington Arms Company, Inc., Bridgeport, Conn., a corporation of Delaware
Filed Mar. 2, 1955, Ser. No. 491,749
11 Claims. (Cl. 1—44.5)

This invention relates to a special purpose guard for a powder actuated tool adapted to drive a hard metal stud into difficultly penetrable materials, such as steel, and contemplates a guard adapted to receive a section of a cylindrical workpiece, such as a metal pipe, while holding in proper relation thereto an object, such as a metal bracket, which is to be secured to the cylindrical work.

The device is particularly adapted to securing to upright metal posts brackets extending horizontally from said posts and adapted to support street and traffic signs.

In the drawings:
FIG. 1 is a section substantially on the line 1—1 of FIG. 3, showing the guard open and including such parts of a stud driver as are necessary to show the relation of the guard thereto.

Figure 1:
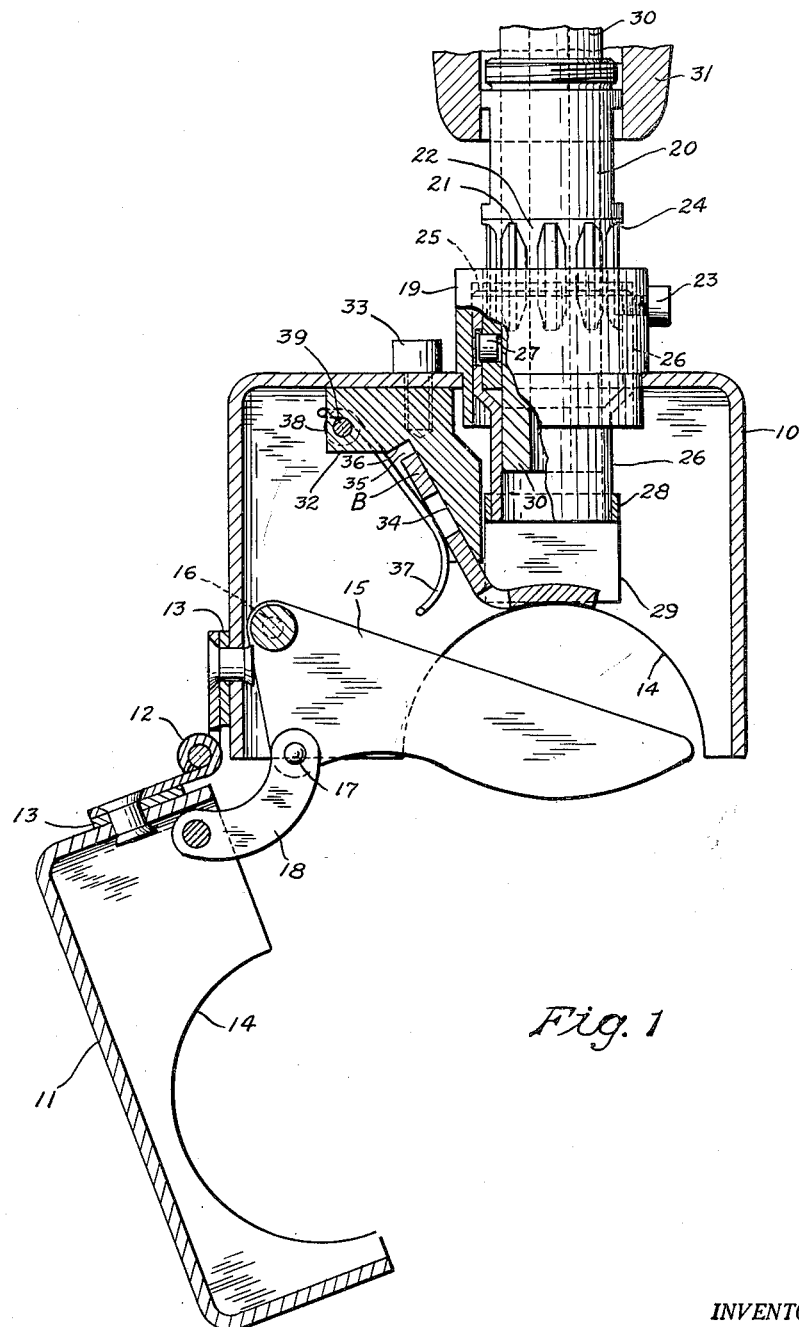
Figure 2:
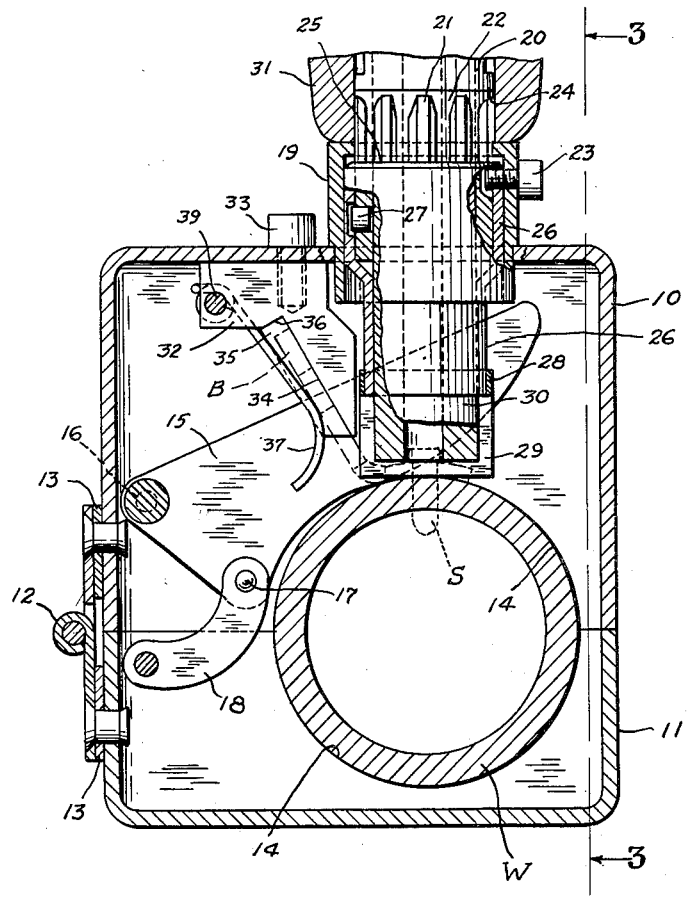
FIG. 2 is a section substantially on the line 2—2 of FIG. 3, showing the guard in closed position and associated parts of the stud driver in firing position. The mid-portion of the bracket holder has been broken away to show the bracket-holding spring and the work—the bracket and the bracket-attaching stud are shown in broken lines.
Figure 3:
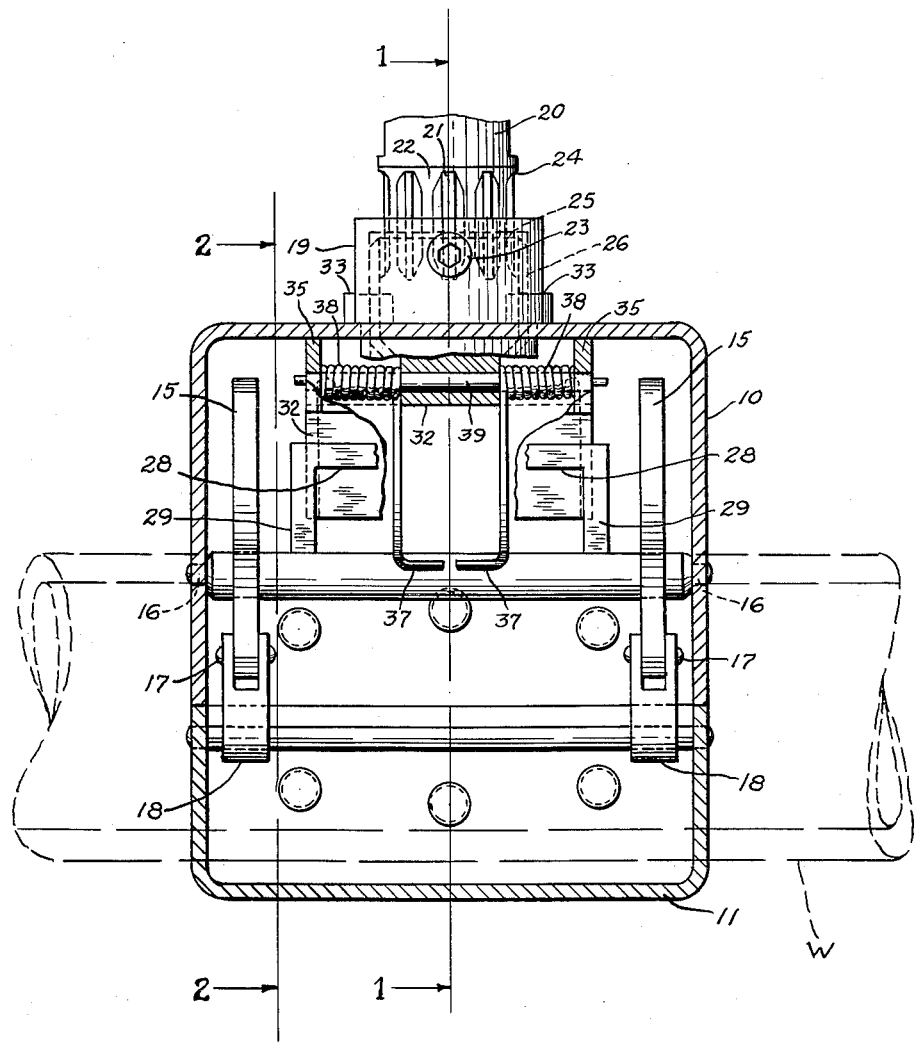
FIG. 3 is a section at right angles to FIGS. 1 and 2, the section being substantially on the line 3—3 of FIG. 2.

The guard comprises a box-like housing consisting of two members which, by reason of their position in the drawings, will be identified as upper housing member 10 and lower housing member 11, said housing members being joined by a strap hinge 12 which, to effect complete closing together of the two housing members, is supported on spacers 13. Opposite walls of each of the housing members comprise semi-circular cut-outs 14 which when the guard is closed (FIG. 2) form a continuous passage through the guard adapted to receive a continuous cylindrical workpiece W, such as a steel pipe. Cams 15 supported on pivots 16 in opposite walls of the upper housing have pivoted thereto at 17 links 18 which in turn are pivoted on the side walls of the lower housing, the arrangement being such that when the guard is open (FIG. 1) the cams intersect the semi-cylindrical passage through the upper housing and, upon the application of the tool to the work, pressure of the work against the lower faces of cams 15 effects the movement of the lower housing about the pivot of hinge 12 to closed position (FIG. 2).

The upper wall of the upper housing member is apertured, and secured in the aperture is a guide sleeve 19 adapted to receive a guide tube 20 of a stud driver of the type shown in the patent to Catlin, No. 2,669,716, February 23, 1954. To minimize the need for reference to the aforesaid patent, it will be stated that the Catlin patent is entitled "Fire Control for Powder Actuated Tools" and discloses stud driver construction in which an action tube extension (corresponding to the guide tube 20 of this invention) surrounds a stud driver barrel rigidly mounted in the main frame of the stud driver, which main frame also carries a reciprocable spring loaded firing pin, a pivotally mounted firing pin sear, and a reciprocable spring loaded sear lock. The barrel, main frame and attached parts are reciprocable with respect to the guide tube. When the guide tube is supported by a work surface, spring means interposed between the guide tube and barrel maintain the barrel, main frame and parts carried by the main frame at one extent of reciprocation remote from the work surface. When manual pressure is applied to the main frame of the tool, urging the tool forwardly against the spring towards the work surface, an element of the stationary guide tube intercepts the advancing reciprocable sear lock and moves the sear lock out of engagement with the sear, thus placing the tool in condition to be fired by actuation of a manual trigger connected to the sear.

In the present invention, a movable support comprising guide tube extension 26 and a yoke 28 with flanges 29 is slidably mounted within guide sleeve 19, and means, to be described, are provided for attaching the guide tube fire control of a stud driver to the movable support. In the embodiment shown, the movable support forms a part of the guard which is retained in the guard by an upper flange on guide sleeve 19 and the conformation of block 32. The movable support comprising the guide tube extension 26, yoke 28, and flanges 29, forms a fire control element in the guard coupled to the support responsive fire control element of a stud driver, which, in the embodiment shown, is the guide tube 20.

A section of said guide tube which is partly received within the guide sleeve 19 comprises longitudinal ribs 21 defining slots 22 adapted to receive the end of a set screw 23 held in a threaded aperture in guide sleeve 19, thereby establishing the relative angular position of the guard and the stud driver of which guide tube 20 is a part. Guide tube 20 is longitudinally movable in guide sleeve 19 between limits established by shoulder 24 on the guide tube and the end 25 of a guide tube extension 26 which is secured to the guide tube by suitable means, such as pins 27, which may be press-fitted in an aperture in guide tube 20 to engage with a suitable bayonet slot formed in guide tube extension 26. To the lower end of guide tube extension 26 there is secured a yoke comprising web 28 apertured to receive the guide tube extension 26 and flanges 29 depending from said web and adapted to engage the surface of a workpiece W in place in the closed guard.

The lost motion between guide tube 20 and the guard is used for the purpose of preventing the firing of the cartridge powered stud driver unless there is a workpiece W in position in the closed guard. As described in the aforementioned patent to Catlin, the tool can be fired only when the stud driver barrel 30 is advanced a predetermined distance relative to the guide tube 20, and to establish this relationship it is necessary that the guide tube be pressed against a solid object with sufficient force to stress a relatively strong spring. In the absence of a workpiece W properly positioned in the closed guard against the flanges 29 there is no abutment for effecting such relative displacement of barrel 30 and guide tube 20. The normal position of barrel 30 with respect to the guide tube is shown in FIG. 1, and the firing position in FIG. 2. Moreover, the firing reaction of the work W against the arcuate faces of the outer guard member 11 tends to open the guard at the wrong time. Such undesirable momentary partial opening of the guard is substantially prevented by so determining the length of the sleeve 19 that when the tool is in firing condition the end portion 31 of the tool housing butts against the end of said sleeve. A firm support of all moving parts of the guard assembly at the instant of firing is thus insured.

Means are provided for holding the bracket B which is to be joined to work W by stud S in such a position within the guard that when the guard is closed the work W comes into correct relation to the bracket, as shown in FIG. 2. This means may be constructed as follows: A block 32 secured to the upper wall of the upper housing member 10 by suitable means such as studs 33 comprises a bracket engaging face 34 of an inclination appropriate to the configuration of the particular bracket which is used. The bracket illustrated comprises a flat plate adapted to be secured to the object to be supported, such as a street sign, and bent off from said plate a portion having a curvature corresponding generally to the curvature of the work W to which the bracket is to be secured. Block 32 comprises side flanges 35 which together with the inclined face 34 and an abutment 36 form a recess of the size and configuration of the flat portion of bracket B. Said bracket is held in said channel by suitable means, such as one or more spring members 37 comprising coiled portions 38 which may be supported on pins 39 held in the upper portion of block 32. Thus, the guard being open, a bracket B may be inserted in said recess and held therein in a definite position by spring 37. A reference mark on the outside of housing member 10 indicates to the operator the location and orientation of the flat of bracket B.

The operation of the device is summarized as follows:

The guard being open (FIG. 1), a bracket B is inserted in the bracket holder between side bars 35 and against the abutment 36, being held in position by spring 37. The tool is then loaded with the stud S, by which the bracket is to be secured to the work W, and with a cartridge containing a propellent charge appropriate to the work to be done. The guard is then presented to the work, so that the cams 15 contact the workpiece W, and the tool with the upper housing member 10 advanced toward the work; whereupon the cams 15 swing about their pivots 16 from the FIG. 1 position to the FIG. 2 position and links 18 swing the lower housing 11 to closed position. As the tool is thrust forward and the attached housing members 10 and 11 reach a workpiece enclosing position (FIG. 2), the yoke flanges 29 engage the workpiece. By such engagement of the yoke flanges 29 with the workpiece, the yoke 28 is supported in the position shown. The guide tube extension 26 and the tool guide tube 20, being assembled to the yoke, are maintained in the position shown. A further forward thrust on the tool now causes the tool barrel 30 to advance relative to the supported guide tube 20, thus freeing the firing mechanism of the stud driver for operation as described in the aforementioned patent to Catlin. If the tool is moved forward relative to the housing parts 10 and 11 and a workpiece is not properly positioned in the housing to support yoke 28, the yoke and attached parts will not be restrained but will move forwardly with the tool and project into the work-receiving passage. Thus, the relative movement required between the barrel 30 and the guide tube 20 will not occur, and the fire control of the tool will not be activated. Unless the tool is held at substantially right angles to the work, the guard will not fully close, and the yokes 28 and 29 will not be properly positioned by the workpiece to enable firing. When the tool and guard are in proper position for firing, the end of the guide sleeve 19 is in engagement with the end of the tool housing 31. This engagement insures that all moving parts are adequately supported to withstand the impact of firing the tool.

What is claimed is:

1. A guard for encircularly enclosing a longitudinal section of a workpiece comprising relatively movable complementary housing members forming in abutting relation a workpiece enclosure, means connecting said members for relative movement, said connecting means including an element displaced by impingement upon a workpiece for moving said members into abutting relation, and means on one of said housing members for mounting said guard on a powder actuated tool.

2. Apparatus according to claim 1, in which said element comprises a cam pivoted to one of said housing members and disposed for displacement by a workpiece, and said connecting means comprises a link joining said cam to the second housing member.

3. A guard for encircularly enclosing a longitudinal section of a workpiece comprising two interconnected relatively movable complementary housing members, cutouts in the walls of said members defining a workpiece receiving passage, means for moving said housing members from an open position to an abutting workpiece enclosing position comprising a cam pivoted to one of said housing members, and a link joining said cam to the second of said housing members, said cam being disposed in said passage for displacement by impingement upon a workpiece, and means for supporting one of said housing members on a powder actuated tool.

4. Apparatus according to claim 3, comprising a holder for a bracket to be secured to the workpiece, said bracket holder being secured within one of said housing members and detent means on said bracket holder to hold a bracket of predetermined configuration in juxtaposition to a workpiece in the closed housing.

5. Apparatus according to claim 4, in which said bracket holder comprises a bracket-receiving recess conforming to the configuration of a portion of said bracket disposed to orient a bracket in the desired position relative to said workpiece passage.

6. Apparatus according to claim 5, said detent means comprising yielding means for holding a bracket in said recess.

7. A guard, for use with a powder actuated tool having a work responsive fire control means, said guard comprising interconnected complementary housing members forming a boxlike enclosure for a longitudinal section of a workpiece, said housing members being relatively movable from a spaced workpiece receiving relation to an abutting, workpiece enclosure relation, coupling means adapted to attach an element of said fire control means of a powder actuated tool on one of said members, and a movably mounted extension for said fire control element disposed in said coupling means, said extension being retained in position to support said fire control element by engagement with a workpiece when said members are in abutting relation.

8. A guard, for use with a powder actuated tool having a work responsive fire control means, said guard comprising two relatively movable complementary housing members for encircularly enclosing a longitudinal section of a workpiece; cut-outs in the walls of said members defining a workpiece receiving passage; means for moving said housing members from an open position to an abutting workpiece enclosing position comprising a cam pivoted to one of said housing members, and a link joining said cam to the other of said housing members, said cam being disposed in said workpiece passage for displacement by impingement of a workpiece thereon; means adapted to attach one of said housing members to an element of said work responsive fire control means of a powder actuated tool, comprising a sleeve in the wall of said member normal to said workpiece passage, and an extension for said fire control element slidably mounted in said sleeve and having means for attachment to said fire control element; said extension being supported from movement by engagement with a workpiece in said passage when said housing members are in abutment.

9. For use with a powder-actuated tool having a fire control responsive to support of a fire control element by a workpiece, a hollow guard for encircularly enclosing a longitudinal section of a workpiece and comprising hinged complementary housing members relatively movable from a spaced workpiece receiving relation to an abutting workpiece enclosing relation, means for moving said members to abutting relation, comprising a cam pivoted to one of said housing members and a link joining said cam to the second of said housing members, said cam being disposed to be displaced by a workpiece as said members are advanced about a workpiece, means on one of said members for operatively mounting thereon said support responsive fire control element of a powder-actuated tool, said mounting means comprising a sleeve mounted normal to said passage in the wall of said member and a tubular extension for said fire control element slidably mounted in said sleeve and having means for attachment to said fire control element, said extension being restrained from sliding movement by engagement with a workpiece enclosed in said passage by said housing members in abutting relation.

10. In a tool having a barrel for driving a fastener element into a structural member, a fixture for attaching a bracket to said structural member; said fixture comprising a pair of sections at least one of which has a cut-out portion to receive said structural member between said sections, one of said sections being attached to said tool, and means on the last said section to receive said bracket in desired position of said bracket adjacent with respect to said structural member for attachment to said structural member by said fastener.

11. A fixture for the muzzle end of the barrel of an explosive powered tool comprising a work-engaging member having a cut-out portion to receive part of a structural workpiece in substantially circumferentially surrounded relationship, said work-engaging member being divided into articulated mating sections to facilitate reception, operable holding and release of said workpiece, means on one of said sections for mounting said barrel in operatively aligned relationship, means for operatively connecting said sections for movement with respect to each other from an open to a closed position about said workpiece, means on at least one of said sections and projecting therefrom to engage and interfere with the workpiece being received in such a manner as to close said sections around said workpiece as said workpiece is emplaced with respect to a part of said cut-out portion in a predetermined aligned relationship with respect to said mounted barrel.

References Cited in the file of this patent

UNITED STATES PATENTS

| | | |
|---|---|---|
| 2,008,362 | Littlehale | July 16, 1935 |
| 2,038,913 | Temple | Apr. 28, 1936 |
| 2,428,958 | Bohaboy et al. | Oct. 14, 1947 |
| 2,518,395 | Sopris | Aug. 2, 1950 |
| 2,660,726 | Weingart | Dec. 1, 1953 |
| 2,766,631 | Van Sittert | Oct. 16, 1956 |